(12) United States Patent
Ritter et al.

(10) Patent No.: US 11,041,551 B2
(45) Date of Patent: Jun. 22, 2021

(54) PIVOTABLE SPINDLE NUT

(71) Applicant: Stabilus GmbH, Koblenz (DE)

(72) Inventors: Andreas Ritter, Hilgert (DE); Peter Oster, Koblenz (DE); Jörg Hillen, Nörtershausen (DE); Oleg Batosky, Boppard (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 16/529,999

(22) Filed: Aug. 2, 2019

(65) Prior Publication Data

US 2020/0040971 A1    Feb. 6, 2020

(30) Foreign Application Priority Data

Aug. 2, 2018 (DE) .................... 10 2018 212 959.2

(51) Int. Cl.
*F16H 25/22* (2006.01)
*F16H 25/20* (2006.01)
*E05F 15/622* (2015.01)

(52) U.S. Cl.
CPC ............ *F16H 25/22* (2013.01); *E05F 15/622* (2015.01); *F16H 2025/209* (2013.01)

(58) Field of Classification Search
CPC ....... F16H 2025/2081; F16H 2025/209; F16H 2025/2031; F16H 2025/2046; F16H 2025/2053; F16H 2025/2084; F16H 2025/2087; F16H 25/22; F16H 25/2454; E05F 15/622; F16C 23/02; F16C 17/02; F16C 17/028; F16C 17/03; F16C 17/035; F16C 17/10; F16C 17/105; F16C 17/26; F16C 11/00

USPC ........................................................ 74/89.14
See application file for complete search history.

(56) References Cited

U.S. PATENT DOCUMENTS

| 4,603,594 | A | * | 8/1986 | Grimm | ................... | F16H 25/20 |
| | | | | | | 74/89.39 |
| 8,008,910 | B2 | * | 8/2011 | Booth | ................... | E05F 15/622 |
| | | | | | | 324/207.2 |
| 10,041,281 | B1 | * | 8/2018 | Miu | ...................... | E05C 17/006 |
| 2007/0179006 | A1 | * | 8/2007 | Kachouh | ............. | H02K 7/1023 |
| | | | | | | 475/154 |
| 2007/0296244 | A1 | * | 12/2007 | Borrmann | ............ | E05F 15/622 |
| | | | | | | 296/146.8 |

(Continued)

FOREIGN PATENT DOCUMENTS

DE           10034025 B4      2/2004
DE      202012003946 U1      7/2012

(Continued)

OTHER PUBLICATIONS

German Application No. DE102018212959.2, "Search Report", dated Aug. 6, 2019, 9 pages.

*Primary Examiner* — Jake Cook
*Assistant Examiner* — T. Scott Fix
(74) *Attorney, Agent, or Firm* — Kilpatrick Townsend & Stockton LLP

(57) ABSTRACT

The invention relates to a spindle drive, comprising a drive unit, a spindle, and a spindle nut in threaded engagement with the spindle, the spindle nut being driven by the drive unit by means of a drive element, and wherein the spindle nut is mounted on the drive element in such a way that the spindle nut and the spindle in threaded engagement with it are pivotable relative to the drive element.

17 Claims, 2 Drawing Sheets

(56) References Cited

U.S. PATENT DOCUMENTS

Figure 1:
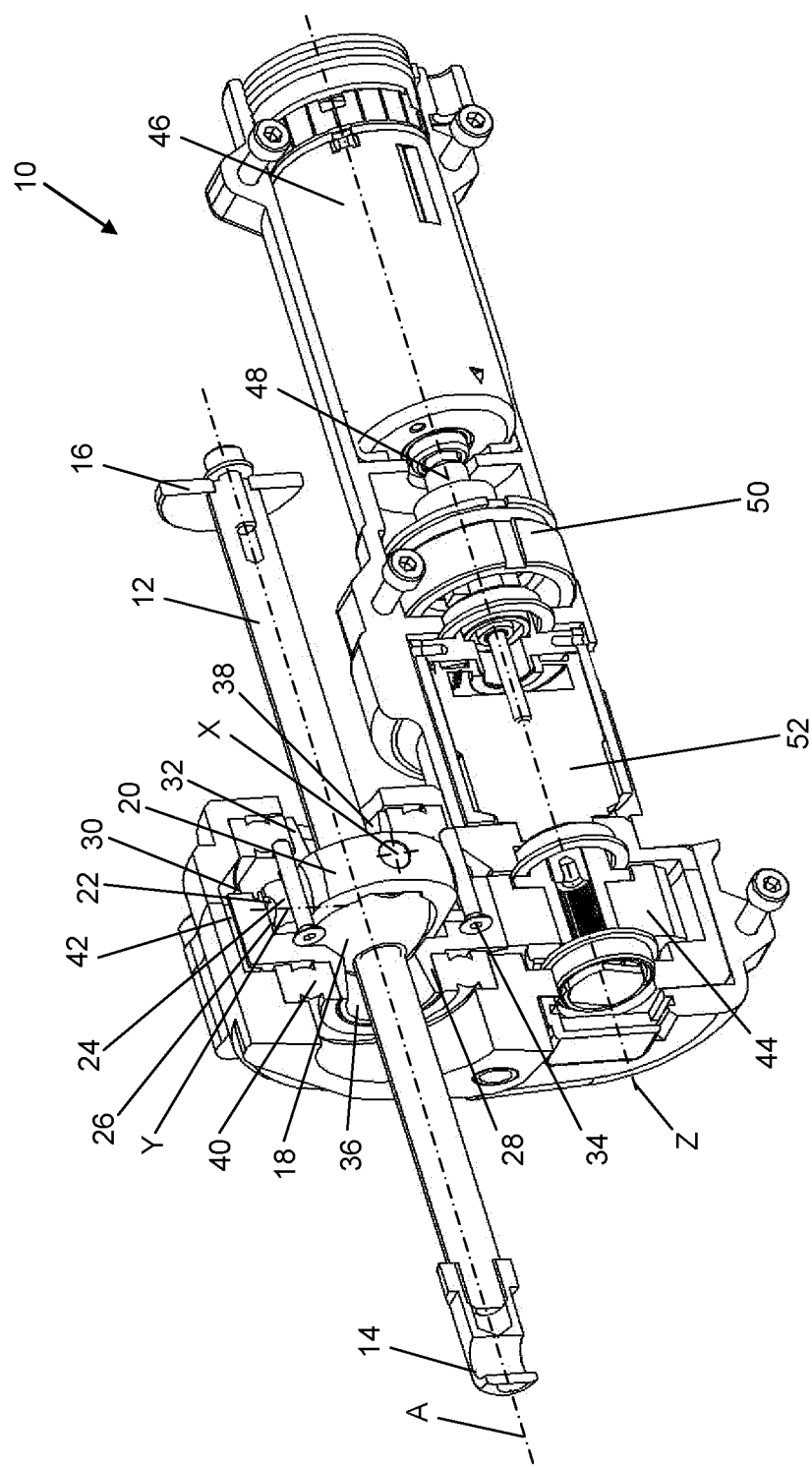

| | | | | |
|---|---|---|---|---|
| 2009/0217596 A1* | 9/2009 | Neundorf | ............... | E05B 81/20 |
| | | | | 49/506 |
| 2013/0133512 A1* | 5/2013 | Mueller | ................. | F16H 33/00 |
| | | | | 92/110 |
| 2013/0213170 A1* | 8/2013 | Kim | ....................... | B25J 18/06 |
| | | | | 74/490.01 |
| 2017/0292311 A1* | 10/2017 | Podkopayev | ......... | E05C 17/203 |
| 2018/0031092 A1* | 2/2018 | Daniel | ............... | F16H 25/2418 |
| 2018/0179788 A1* | 6/2018 | Oxley | .................... | E05B 81/13 |
| 2018/0223583 A1* | 8/2018 | Podkopayev | ........... | F16D 3/207 |
| 2019/0145137 A1* | 5/2019 | Ueno | ....................... | E05F 5/06 |
| | | | | 16/82 |
| 2020/0056689 A1* | 2/2020 | Lawlor | ............... | F16H 25/2252 |
| 2020/0189549 A1* | 6/2020 | Mazzarini | ............... | F16D 51/22 |
| 2020/0232267 A1* | 7/2020 | Rehm | .................. | E05F 1/1058 |

FOREIGN PATENT DOCUMENTS

| | | |
|---|---|---|
| DE | 102012106196 B3 | 5/2014 |
| DE | 102017107887 A1 | 10/2017 |
| DE | 102017204914 A1 | 10/2017 |

\* cited by examiner

PIVOTABLE SPINDLE NUT

CROSS REFERENCE TO RELATED APPLICATION

This application claims priority to German Patent Application No. 10 2018 212 959.2, filed in Germany on Aug. 2, 2018, the entire content of which is hereby incorporated herein by this reference.

The invention relates to a spindle drive, comprising a drive unit, a spindle, and a spindle nut engaged with the spindle in a threaded engagement.

Spindle drives are used in a wide variety of fields to move one element relative to another element in a motorised operation. One field of application in which spindle drives are used frequently is the automated actuation of hatches of a vehicle such as doors and tailgates. Due to the pivoting movements of such hatches on the vehicle body, a spindle drive, which drives this hatch relative to the vehicle body, must, in some cases quite elaborately, be mounted on the hatch on the one side and on the vehicle body on the other side in order to be able to follow all the movements of the hatch.

This complex mounting of the spindle drive requires the respective space. Furthermore, this mounting may be very costly and maintenance intensive.

For the sake of clarity, the present invention will be described with reference to a vehicle body and a vehicle door, but the scope of the invention is in no way limited to this example.

DE 10 2017 204 914 A1 discloses a spindle drive in which a spindle is driven. A connecting element is pivotally mounted on a spindle nut in a threaded engagement and is configured for example to form a connection with an aforementioned hatch. However, the arrangement described in this prior art has the disadvantage that it also requires a connecting element between the spindle nut and the element to be driven, which in turn increases the space that is required.

It is therefore the object of the following invention to provide a spindle drive which can follow the pivoting movements of a driven element such as those of a vehicle door relative to a vehicle body and yet have a simple structure.

According to the invention, the object is achieved by a spindle drive comprising a drive unit, a spindle, and a spindle nut in engagement with the spindle wherein the spindle nut is driven by the drive unit by means of a drive element, and wherein the drive nut is mounted on the drive element in such a way that the spindle nut and the spindle in threaded engagement with it are pivotable relative to the drive element.

The drive unit drives the drive element in such a way that the spindle nut is set in rotation whereby the spindle is translationally displaced relative to the spindle nut. The mounting of the spindle nut in the drive element allows the spindle nut to pivot together with the spindle relative to the drive element so as to easily move a door, i.e. to accommodate a mounting of the spindle drive on one side relative to a vehicle body, i.e. a mounting of the spindle drive on the other side, even if occurring not only in one direction, for example in a direction parallel to a rotational axis of the drive element.

Since the pivoting of the two mounting sides of the spindle drive can be accommodated by the mount of the spindle nut in the drive element, the interfaces or mounts of the spindle drive to the door or to the vehicle body can be designed in a simple manner, for example in the form of a simple ball socket mount. Due to the arrangement according to the invention, the space occupied by the spindle drive can be reduced which in turn can advantageously affect the production costs of a corresponding door unit. The spindle nut and spindle in threaded engagement with it are thus also mounted pivotably relative to the drive unit.

The drive element can be made of a metal, in particular of steel, or of a plastic, in particular of POM, PA, or glass-fibre-reinforced materials, but of course also of any other suitable material. Depending on the choice of the material of the drive element, it may be produced by using an injection moulding process, a forging process, a casting process, or a machining process.

Advantageously, the spindle nut can be gimballed to the drive element. A gimbal mounting of the spindle nut in the drive element may allow for a pivoting of the spindle relative to the drive element in any direction.

As is generally known, a gimbal mounting is understood to mean a mounting in two intersecting mutually perpendicular pivot bearings or two intersecting mutually perpendicular axes.

In a further development of the present invention, it is proposed that the drive element may have toothing on an outer circumference which engage with a gear wheel driven by the drive unit. The gear wheel driven by the drive unit gear may also have, on its outer periphery, toothing which is in engagement with the toothing of the drive element so that the rotation of the driven gear wheel causes a rotation of the drive element and thus the spindle nut. Such toothing may also be referred to as spur gear toothing. A gear ratio may be provided between the driven gear wheel and the drive element, for example, based on different diameters of the respective toothing-bearing surfaces of the driven gear wheel and the drive element. In this case, the axes of rotation of the drive unit driven by the gear wheel and the drive element may be aligned substantially parallel.

In particular, the longitudinal axis of the spindle may, in a position that is parallel, in particular coaxial, to the axis of rotation, be oriented substantially parallel to the longitudinal axis of a driven shaft of the drive unit. Due to this arrangement, the spindle drive according to the invention may have a narrow, elongated overall shape. In particular in arrangements of the spindle drive, in which a small thickness of the spindle drive is required, this arrangement of the drive unit relative to the spindle may offer advantages in terms of space.

In an embodiment of the spindle drive according to the invention, the drive element may, as an alternative to the spur gear toothing, be connected to a worm wheel, which is in engagement with a worm driven by the drive unit. Due to the engagement, in particular the threaded engagement, of the worm with the worm wheel, a rotation of the worm may cause a rotation of the worm wheel. A gear ratio may be provided between the worm and worm wheel, for example, based on different diameters and the number of teeth of the surfaces of the worm and the worm wheel supporting the worm toothing. The worm toothing may cause less noise than the spur gear toothing. The axes of rotation of the worm wheel driven by the drive unit and the drive element may be oriented substantially orthogonally.

In particular, the longitudinal axis of the spindle may, in a position that is parallel, in particular coaxial, to the axis of rotation, be oriented substantially perpendicular to the longitudinal axis of a driven shaft of the drive unit. Due to this arrangement, the spindle drive according to the invention may have an overall shape that is short, wide, or compressed relative to the structure with spur gear toothing. In particular in arrangements of the spindle drive, in which a small spindle drive length is required, this arrangement of the drive unit relative to the spindle may offer advantages in terms of space.

Of course, it is also conceivable that the axis of rotation of the worm wheel and the axis of rotation of the drive element form an angle other than 90° so that the worm is inclined to the worm wheel.

Advantageously, the drive element and the worm wheel may be formed as one piece. A one-piece design of the worm wheel with the drive element may reduce the space required by these two components. Furthermore, due to the one-piece design, a susceptibility to error of the spindle drive may be reduced because, for example, the drive element may prevent the worm wheel from loosening or detaching. In addition, this eliminates assembly costs.

In one development of the present invention, the drive element may have at least one conical opening which widens from the spindle nut to the outside of the drive element and through which the spindle passes. A conical opening may ensure that the spindle, i.e. an outer surface surrounding the spindle, abuts against a flat surface of the opening at the end of its intended pivoting range. In contrast to the abutment of the spindle against an edge, any damage to and/or tilting of the spindle may be avoided in this manner. Due to the opening angle of the conical opening, a maximum pivoting range of the spindle and therefore of the spindle nut may be defined relative to the drive element in a simple manner. Advantageously, such a conical opening is provided in both exit directions of the spindle from the drive element.

The spindle nut may be substantially spherical to allow for an unimpeded pivoting of the spindle nut within the drive element. It is also conceivable for the spindle nut to have two spherical surfaces which are connected by a substantially cylindrical section.

In one development of the present invention, a gear mechanism, in particular a planetary gear, may be arranged between the drive element and the drive unit. This means that a rotational speed of the drive unit or of a driven shaft of the drive unit is translated due to the gear mechanism so that, for example, the above-mentioned driven gear wheel or the above-mentioned worm is driven in accordance with the gear ratio.

In a further embodiment of the present invention, a brake, in particular a friction brake, may be arranged between the drive element and the drive unit. Such a brake may prevent, for example, a load acting on the spindle which is, for example, caused by the weight of a door of a vehicle in an inclined position, from passively driving the spindle drive so that the spindle is translationally displaced relative to the spindle nut, i.e. so that a distance between the two ends of the spindle drive, to which the same is coupled in each case to a superordinate assembly, changes. This makes it possible to prevent the door of the vehicle mentioned as an example to independently move out of a desired position independently without being driven by the spindle drive.

Preferably, the brake of the drive unit may be arranged adjacently. Since the brake force of the brake, unless it is assigned to a unit decoupling the brake, must be overcome with each activation of the spindle drive, it may be advantageous to arrange the brake as closely as possible to the drive unit, i.e. when viewed from the drive unit, in front of any gear mechanisms or translations to reduce a force to be overcome by the drive unit as much as possible and/or to increase a force acting on the spindle drive from the outside, for example by the above-mentioned door, which is necessary without any drive from the drive unit to displace the spindle relative to the spindle nut.

The drive element may comprise a base element and a cover element wherein, in the base element, two followers may be accommodated in which a cage element is pivotally mounted around a first axis, in which the spindle nut is pivotally mounted around a second axis perpendicular to the first axis, wherein the cover element may rigidly position the followers in the base element. Such a structure of the drive element may facilitate a particularly simple assembly of the drive element or the drive element and the spindle nut.

First, the spindle nut may be connected to the cage element, for example, wherein the cage element with the spindle nut is pinned on two opposite sides, thus forming the pivot axis of the spindle nut relative to the cage element. Next, the followers may be placed on two pin-shaped projections, which share an axis, which in turn is perpendicular to the pivot axis of the spindle nut to the cage element, with the cage element being pivotable relative to the followers by means of the pin-shaped projections. The unit consisting of the spindle nut, the cage element, and the followers may then be inserted into the base element with the followers engaging in the corresponding recesses of the base element. To secure the follower on the base element, the cover element may finally be connected, for example screwed, to the base element. Of course, it is also conceivable that the cover element comprises a plurality of separate elements which secure each follower to the base element individually.

The pin-shaped projections on the spindle nut may either be integrally formed therewith or be connected to the spindle nut as separate elements. The pin-shaped projections may be inserted into the spindle nut directly or by using an intermediate element, for example screwed, glued, or welded. The intermediate element may be present in the form of a socket which connects a respective pin-shaped projection with the spindle nut.

Optionally, the spindle may be connected to the spindle nut in front of or behind the above-mentioned assembly of the drive element.

Figure 2:
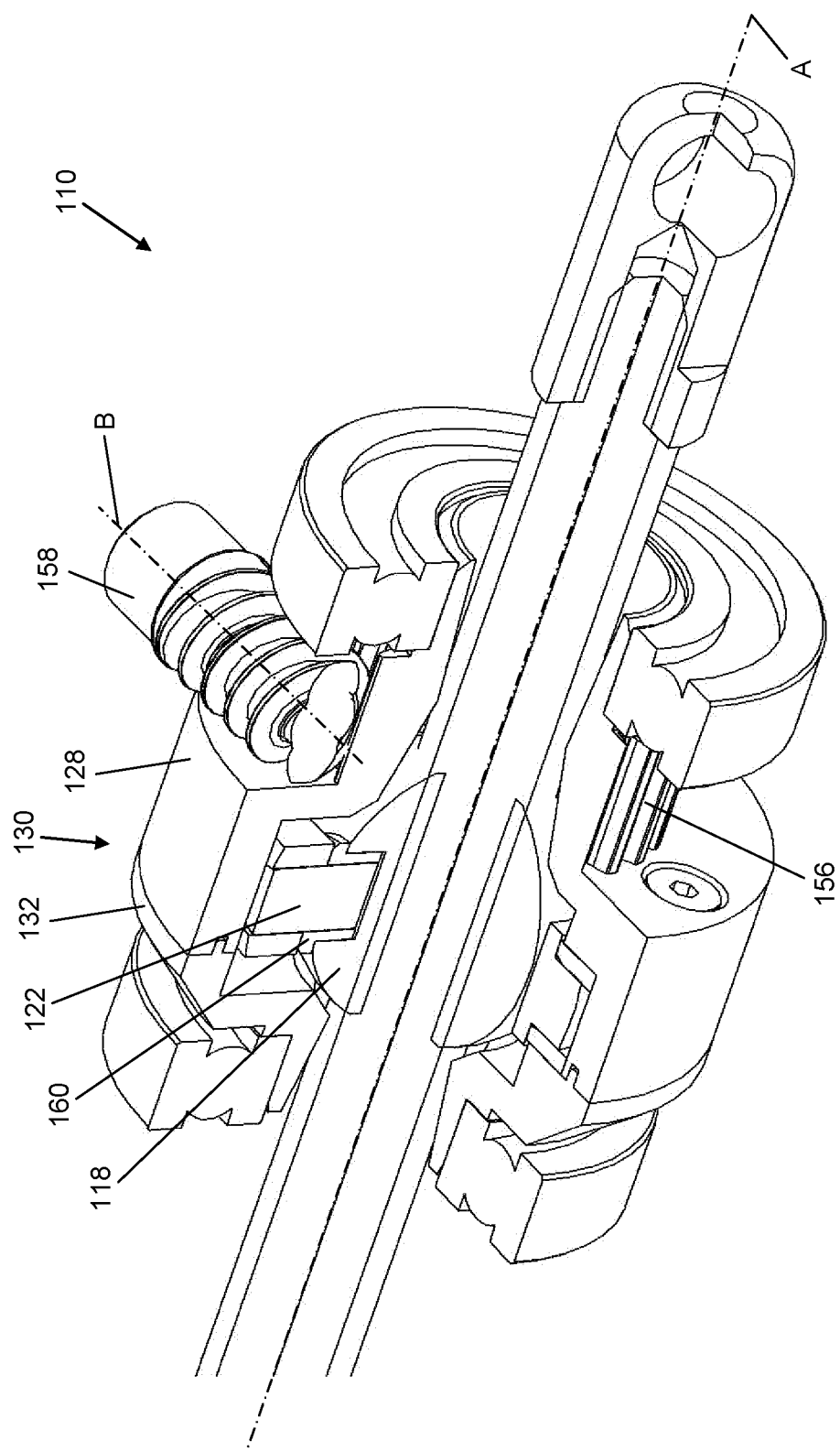

Below, the invention will be described in more detail with the help of two embodiments and with reference to the accompanying drawings, in which FIG. 1 shows a side cross-sectional view of a first embodiment of the spindle drive according to the invention, FIG. 2 shows a view of a three-quarter section of a second embodiment of the spindle drive according to the invention.

In FIG. 1, a spindle drive according to the invention is generally identified with the number 10.

The spindle drive 10 comprises a spindle 12 which has, at its one end, a connection unit 14 for connecting with a superordinate assembly (not shown), such as a door of a vehicle, and at its other end a stop 16 which may serve to limit a translational displacement of the spindle 12.

The spindle 12 is in a threaded engagement with a spindle nut 18 in such a way that a rotation of the spindle nut 18 causes a translational displacement of the spindle 12 relative to the spindle nut 18 when the spindle 12 is rotatably connected to the superordinate assembly.

The spindle nut 18 is accommodated in a cage element 20 with the spindle nut 18 being mounted pivotably relative to the cage element 20 around a pivot axis X. The pivot axis X is formed here by two opposing pins which connect the spindle nut 18 with the cage element 20.

The cage element 20 here has two pin-shaped projections 22 which together define a second pivot axis Y. In each case, a follower 24 is arranged on the two pin-shaped projections 22 with the followers 24 and the cage element 20 being mounted so as to be rotatable around the pivot axis Y.

The followers 24 are received in corresponding recesses 26 of a base element 28 of a drive element 30 of the spindle drive 10 according to the invention. The followers 24 are fixed in the recesses 26 in such a way that they are not displaceable rotationally relative to the base element 28. For the translational fastening of the follower 24 in the base element 28, a cover element 32 of the drive element 30 is connected to the base element 28 wherein, in the illustrated embodiment, the base element 28 and the cover element 32 are connected to the drive element 30 by screws 34. The cover element 32 connected to the base element 28 clamps the followers 24 between itself and the base element 28.

The mounting of the spindle nut 18 and/or the spindle nut 18 together with the cage element 20 in the drive element 30 described above allows for a pivoting of the spindle nut 18 and thus of the spindle 12 relative to the drive element 30 in any direction.

To limit a pivot range of the spindle 12 relative to the drive element 30, both the base element 28 and the cover element 32 comprise tapered openings 36 and 38 whose walls the spindle 12 may strike when it reaches the end of the defined pivot range.

The spindle nut 18 is here spherically formed at least on the surfaces which protrude from the cage element 20 so as to allow an unimpeded displacement of the spindle nut 18 in the drive element 30.

The drive element 30 is rotatably mounted together with the followers 24, the cage element 20, and the spindle nut 18 in a housing of the spindle drive 10 via bearings 40, for example ball bearings.

The base element 28 of the drive element 30 has, on its outer circumference, a toothing 42, which is in engagement with a gear wheel 44, whose axis of rotation Z is parallel to a longitudinal axis A of the spindle 12, in the orientation of the spindle 12 shown in FIG. 1 as substantially parallel. The gear wheel 44 is driven by a drive unit 46 wherein a driven shaft 48 of the drive unit 46 has a central axis which lies on the axis of rotation Z.

Between the drive unit 46 and the gear wheel 44, a friction brake 50 is arranged which, depending on its braking force, for example, prevents a pushing or pulling force acting on the connection unit 14 from causing a rotation of the drive element 30 without the drive unit 46 being activated.

Furthermore, a planetary gear 52 is arranged between the drive unit 46 and the gear wheel 44 which provides a ratio of the rotational speed and the torque of the driven shaft 48 of the drive unit 46 to the rotational speed and the torque of the gear wheel 44.

An activation of the drive unit 46 thus causes a rotation of the gear wheel 44 which causes the drive element 30 to start rotating on the basis of the toothing of the base element 28 with the gear wheel 44 in the sense of a spur gear toothing. The rotation of the drive element 30 is transmitted to the spindle nut 18 by means of the followers 24 and the cage element 20. Due to the threaded engagement of the spindle nut 18 with the spindle 12, a rotation of the spindle nut 18 in turn causes the spindle 12 to be translationally displaced relative to the same according to the rotational direction of the spindle nut 18.

FIG. 2 shows a second embodiment of a spindle drive 110 according to the invention which essentially differs from the spindle drive 10 shown in FIG. 1 only in that a worm toothing is provided instead of the spur gear toothing between the gear wheel 44 and the base element 28. Therefore, components of the spindle drive 110, which are similar to those components of the spindle drive 10, are provided with the same reference numerals but increased by the number 100. With respect to the components and the description of the spindle drive 110, reference is hereby expressly made to the description relating to the spindle drive 10.

The spindle drive 110 comprises a drive element 130 which comprises a cover element 132 and a base element 128. A worm wheel 156 is connected to the base element 128 with the base element 128 here being integrally formed with the worm wheel 156. The worm wheel 156 has an axis of rotation A' which is coaxial with the base element 128. In the exemplary embodiment illustrated in FIG. 2, the worm wheel 156 has a smaller outer diameter than the base element 128.

A worm 158 is engaged with the worm wheel 156 so that a rotation of the worm 158 causes a rotation of the worm wheel 156.

The axis of rotation B of the worm 158 is substantially orthogonal to the axis of rotation A'. At least one drive unit 146, but also a friction brake 150 and a planetary gear 152, may be connected to the worm 158. A driven shaft 148 assigned to the drive unit 146 may have a longitudinal axis which is parallel to the axis B, in particular coaxial.

With regard to further components, features, and functions of the spindle drive 110, explicit reference is made at this point once again to the description of the spindle drive 10.

FIG. 2 shows as well that a pin-shaped projection 122 is inserted into a spindle nut 118 by using an intermediate element 160. The pin-shaped projection 122 together with the intermediate element 160 is pressed here into the spindle nut 118.

The invention claimed is:

1. A spindle drive, comprising:
a drive unit,
a spindle having a longitudinal axis, and
a spindle nut in threaded engagement with the spindle,
wherein the spindle nut is driven by the drive unit by means of a drive element, and
wherein the spindle nut is mounted on the drive element so that the spindle nut and the spindle in threaded engagement with the spindle nut are pivotable relative to the drive element,
wherein the drive element comprises a base element and a cover element, wherein the base element accommodates two followers in which a cage element is pivotably mounted around a first axis, in which the spindle nut is pivotably mounted around a second axis which is perpendicular to the first axis, wherein the cover element positions the followers rigidly in the base element, and wherein the first axis and the second axis are different from the longitudinal axis of the spindle.

2. A spindle drive according to claim 1, wherein the spindle nut is gimballed to the drive element.

3. A spindle drive according to claim 1, wherein the drive element has toothing on an outer circumference which are in engagement with a gear wheel driven by the drive unit.

4. A spindle drive according to claim 3, wherein the longitudinal axis of the spindle, in a position that is parallel to an axis of rotation of the drive element, is oriented substantially parallel to the longitudinal axis of a driven shaft of the drive unit.

5. A spindle drive according to claim 1, wherein the drive element is connected to a worm wheel which engages with a worm driven by the drive unit.

6. A spindle drive according to claim 5, wherein the longitudinal axis of the spindle, in a position that is parallel to an axis of rotation of the drive element, is oriented substantially perpendicular to the longitudinal axis of a driven shaft of the drive unit.

7. A spindle drive according to claim 6, wherein the longitudinal axis of the spindle is coaxial to the axis of rotation of the drive element.

8. A spindle drive according to claim 5, wherein the drive element and the worm wheel are integrally formed.

9. A spindle drive according to claim 1, wherein the drive element has at least one conical opening which widens from the spindle nut to the outside of the drive element and through which the spindle passes.

10. A spindle drive according to claim 1, wherein the spindle nut is substantially spherical.

11. A spindle chive according to claim 1, wherein a gear mechanism is arranged between the drive element and the drive unit.

12. A spindle drive according to claim 11, wherein the gear mechanism is a planetary gear.

13. A spindle drive according to claim 1, wherein a bike is arranged between the drive element- and the drive unit.

14. A spindle drive according to claim 13, wherein the brake is arranged adjacently to the drive unit.

15. A spindle drive according to claim 13, wherein the brake is a friction brake.

16. A spindle drive according to claim 1, wherein the first axis is a pivot axis, wherein the cage element comprises a plurality of projections that define the pivot axis, and wherein a follower of the two followers is arranged on the plurality of projections.

17. A spindle drive according to claim 1, wherein each of the two followers is arranged in a corresponding recess of the base element, and wherein the cover element clamps the two followers between the cover element and the base element.

* * * * *